United States Patent [19]

Oshikubo

[11] Patent Number: 4,909,991

[45] Date of Patent: Mar. 20, 1990

[54] VARIABLE PIPETTE

[75] Inventor: Yuji Oshikubo, Chiba, Japan

[73] Assignee: Nichiryo Co., Ltd., Tokyo, Japan

[21] Appl. No.: 143,741

[22] Filed: Jan. 14, 1988

[30] Foreign Application Priority Data

Sep. 18, 1987 [JP] Japan ............................... 62-234512

[51] Int. Cl.[4] ........................... G01N 1/14; B01L 3/02

[52] U.S. Cl. ................................. 422/100; 73/864.13; 73/864.14; 73/864.18

[58] Field of Search ...................... 422/100; 73/864.11, 73/864.13, 864.14, 864.16, 864.18; 141/25, 27

[56] References Cited

U.S. PATENT DOCUMENTS

| | | | |
|---|---|---|---|
| 3,646,817 | 3/1972 | Hinchman et al. | 73/864.14 |
| 3,918,308 | 11/1975 | Reed | 73/854.14 |
| 4,054,062 | 10/1977 | Branham | 73/864.14 |
| 4,283,950 | 8/1981 | Tervamäki | 73/864.14 |
| 4,418,580 | 12/1983 | Satchell et al. | 73/864.14 |
| 4,435,989 | 3/1984 | Meyer et al. | 73/864.14 |
| 4,679,446 | 7/1987 | Sheehan et al. | 422/100 X |

FOREIGN PATENT DOCUMENTS

| | | | |
|---|---|---|---|
| 2029723 | 3/1980 | United Kingdom | 422/100 |

*Primary Examiner*—Christine M. Nucker
*Assistant Examiner*—Lynn M. Kummert
*Attorney, Agent, or Firm*—James E. Nilles

[57] ABSTRACT

A variable pipette is disclosed which is so designed that its volumetric capacity for sucking and discharging a sample is variable. A first-stage stroke $l_1$ for sucking and discharging a sample is defined between a first first-stage stop portion of a nut and a second first-stage stop portion of an actuating shaft, and this stroke $l_1$ is set through the actuating shaft, a first stop portion of a threaded hollow shaft, the hollow shaft and the nut, not through any portion of the body of the pipette. Therefore, even if the temperature of the body is raised by the heat transmitted from the operator's hand as it grips the pipette and the body is thereby expanded axially, the above-described stroke $l_1$ is independent of the expansion of the body and there is therefore hardly any error produced in the stroke $l_1$. Accordingly, it is possible to improve the reproducibility of quantitative determination carried out with the pipette when a sample is sucked and discharged, and it is therefore possible to improve the reliability of the device.

6 Claims, 2 Drawing Sheets

VARIABLE PIPETTE

BACKGROUND OF THE INVENTION:

1. Field of the Invention

The present invention relates to a variable pipette which is designed to have a variable volumetric capacity for sucking and discharging samples.

2. Description of the Related Art

As one example of a conventional variable pipette, an "Adjustable Pipette" is disclosed in Japanese Patent Publication No. 57-13338 (1982). According to this prior art, a continuous plunger unit (having a first first-stage stop portion and a first second-stage stop portion) is axially and slidably accommodated in a body. This plunger unit is biased rearwardly by a first-stage spring so that the first first-stage top portion is brought into contact with a second first-stage stop portion which is movably provided on the body. Further, a member which defines a second second-stage stop portion is movably fitted on the plunger unit and axially and slidably accommodated in the body. This second second-stage stop member is similarly biased rearwardly by a second-stage spring so as to be brought into contact with a first-stage spring retainer which is formed as an integral part of the body. In operation, the plunger unit is first pushed against the force of the first-stage spring so as to slide by an amount corresponding to a first-stage stroke until the first and second second-stage stop portions abut against each other. In operation, the tip portion at the distal end of the pipette is immersed in a sample. Subsequently, the plunger unit is allowed to slide back, thus causing the sample to be sucked up into the tip portion. Then, the plunger unit is pushed so as to slide by an amount corresponding to the first-stage stroke again, thereby discharging the sample. Thereafter, the plunger unit, together with the second second-stage stop member, is pushed so as to slide by an amount corresponding to a second-stage stroke against the forces of the first- and second-stage springs, thus completely discharging the sample remaining in the tip.

According to the above-described prior art, the first-stage stroke is set between the plunger unit and the second second-stage stop member through the second first-stage stop portion, the body and the first-stage spring retainer. Since the body of the pipette is gripped in the operator's hand, the temperature of the body rises and inevitably thermal expansion is caused. Therefore, if the first-stage stroke is set through the body as in the case of the above-described arrangement, an erroneous stroke may be produced during the use of the pipette. Accordingly, the prior art involves the risk that a problem may arise from the thermal expansion in regard to the reproducibility of quantitative determination carried out when a sample is sucked and discharged. Since the accuracy of this reproducibility is usually questionable to the extent of something like 0.3 to 0.4% of the suction capacity of the pipette, the effect of the above-described thermal expansion of the body cannot be ignored, and it has therefore been desired to solve the problem of this thermal expansion. In addition, since the parts which define the first-stage stroke are assembled on the basis of the body, it is not only difficult to conduct the assembly operation itself but also to lower the cost of assembly.

SUMMARY OF THE INVENTION

In view of these circumstances, it is a primary object of the present invention to provide a novel variable pipette which overcomes the above-described problems of the prior art.

It is a main object of the present invention to improve the reproducibility of quantitative determination of a pipette carried out when a sample is sucked and discharged, thereby improving the reliability of the device.

It is a further object of the present invention to facilitate the assembly operation and to correspondingly lower the cost of assembly.

To this end, the present invention provides a variable pipette comprising: a substantially tubular body having a first opening at one end thereof, a second opening at the other end thereof, and a positioning portion provided at a predetermined position on the inner periphery of the body; a substantially tubular cylinder rigidly secured to the first opening of the body; a nut having an inner peripheral threaded portion, a first first-stage stop portion, and a first second-stage stop portion, the nut being inserted in the body between the positioning portion and the cylinder such that the nut is unable to rotate relative to the body but is axially slidable relative to said body; a second-stage spring accommodated within the body such as to bias the nut rearwardly is that the nut is brought into contact with the positioning portion; a threaded hollow shaft inserted into the second opening of the body, the shaft having a first stop portion at its rear portion and an outer peripheral threaded portion at its forward portion, the threaded portion being in threaded engagement with the inner peripheral threaded portion of the nut so that the shaft is rotatable; an actuating shaft received in the hollow shaft in such a manner that the actuating shaft is rotatable together with the hollow shaft in one unit and is axially slidable relative to said hollow shaft, the actuating shaft having a second first-stage stop portion at its forward portion which projects from the forward end of the hollow shaft, the second first-stage stop portion facing the first first-stage stop portion of the nut across a space which defines a first-stage stroke, the actuating shaft further having a second stop portion and an actuating portion at its rear portion; a plunger received in the cylinder to define an airtight cylinder chamber within the cylinder, the plunger being movable at least axially together with the actuating shaft in one unit; a first-stage spring accommodated within the body and/or the cylinder such as to bias the plunger and the actuating shaft rearwardly thereby bringing the second stop portion of the actuating shaft into contact with the first stop portion; and a second second-stage stop portion provided on either the body or the cylinder so as to face the first second-stage stop portion of the nut across a space which defines a second-stage stroke.

By virtue of the above-described arrangement, the first-stage stroke for sucking and discharging a sample is defined between the first first-stage stop portion of the nut and the second first-stage stop portion of the actuating shaft. Accordingly, this stroke is set through the actuating shaft, the first stop portion of the threaded hollow shaft, the hollow shaft and the nut, not through any portion of the body interposed between these members.

The above and other objects, features and advantages of the present invention will become clear from the following description of the preferred embodiment thereof taken in conjunction with the accompanying drawings.

DESCRIPTION OF THE PREFERRED EMBODIMENT

One embodiment of the present invention will be described hereinunder in detail with reference to the accompanying drawings.

Figure 1:
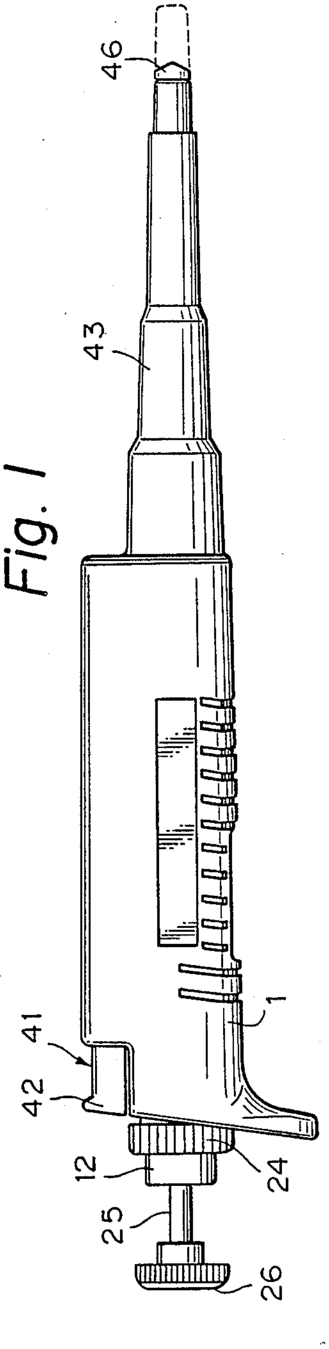
FIGS. 1 and 2 are a side view and a longitudinal sectional view, respectively, of one embodiment of the variable pipette according to the present invention.
Figure 2:
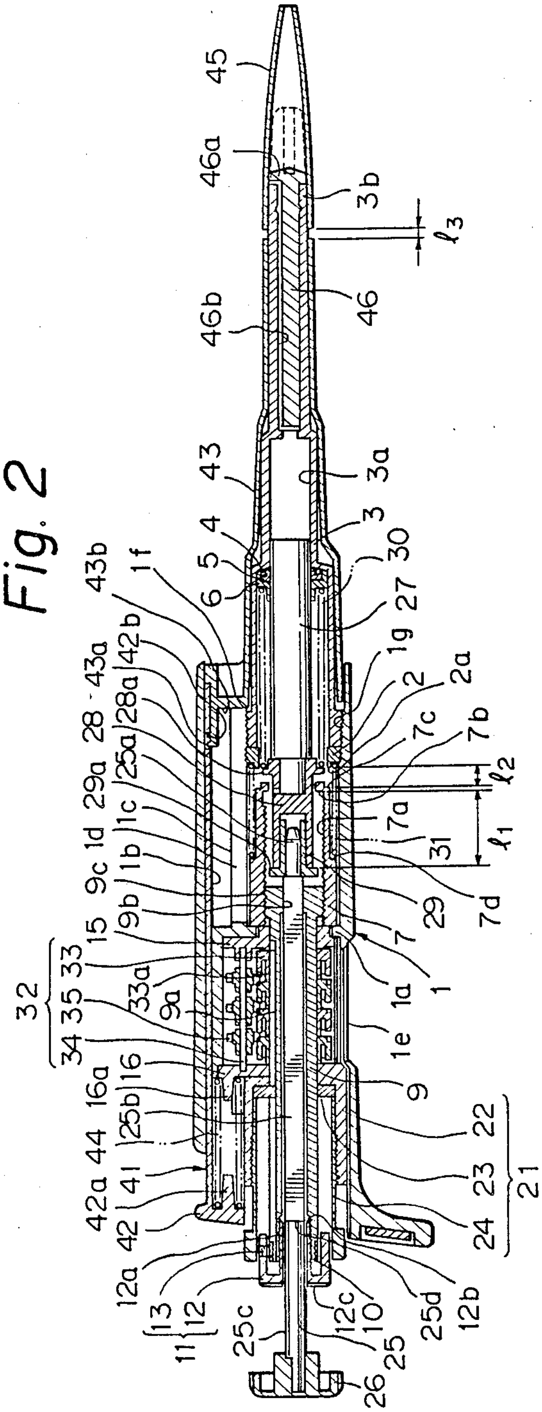

Referring to FIGS. 1 and 2, a tubular body 1 of the variable pipette according to the present invention has a step portion 1*a* formed on the inner periphery of a substantially central portion of the body 1, a through-bore 1*b* for receiving a first ejector 42, an axially extending slot 1*d* provided in a wall portion 1*c* which define the through-bore 1*b*, a transparent display window 1*e*, and a stop portion 1*f* for stopping the travel of a second ejector 43. The body 1 further has display mechanism securing plates 15, 16 positioned in contact respectively with the step portion 1*a* and another portion of the body 1 which is located to the left (as viewed in FIG. 2 of the step portion 1*a*, the plate 15 being made of corrosion-resistant aluminium and the plate 16 of resin materials, respectively. A spring seat 2 is rigidly screwed into an inner peripheral threaded portion 1*g* formed on the right end portion of the body 1 as viewed in FIG. 2. The spring seat 2 has a second second-stage stop portion 2*a*. Alternatively, the spring seat 2 can be integrally formed either on the body 1 or on a cylinder 3 (described below).

Figure 3:
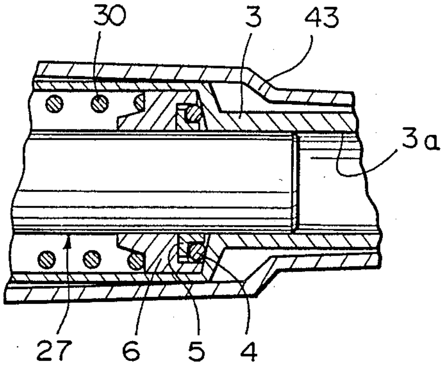
FIG. 3 is a fragmentary enlarged sectional view showing the sealing portion of the embodiment.

A cylinder 3 made of a resin material has a cylinder chamber 3*a* and a nozzle portion 3*b* for fitting a tip 45 thereon. Further, as shown in FIG. 3, a seal member consisting of an O-ring 4 and a seal ring 5 made of Teflon and a spring seat 6 are accommodated inside an inner peripheral step portion of the cylinder 3. The proximal end of the cylinder 3 is received into the opening at one end of the body 1 and rigidly screwed in the inner peripheral threaded portion 1*g*. Thus, the greater part of the cylinder 3 projects outwardly from the body 1. In general, if the cylinder 3 is accommodated within the body 1, when the temperature of the body 1 is raised by the heat transmitted from the operator's hand as it grips the body 1, that heat is also transmitted to the cylinder 3, thus causing a change in the volumetric capacity of the cylinder chamber 3*a*. In such a case, there is a risk of an erroneous measurement being made of a sample sucked u into the cylinder chamber 3*a*. However, the above-described arrangement enables the cylinder 3 to be independent of the heat from the body 1 and therefore permits a corresponding increase in the degree of measurement accuracy. Since the cylinder chamber 3*a* and the nozzle portion 3*b* are formed integrally, no seal member is needed therebetween. Thus, the arrangement is simplified, the number of parts required is reduced, and maintenance is facilitated.

A nut 7 made of corrosion-resistant aluminium has an inner peripheral threaded portion 7*a*, a first first-stage stop portion 7*b*, a first second-stage stop portion 7*c* and a spring seat 7*d*. The nut 7 is axially slidably fitted in the right end portion of the body I as viewed in FIG. 2. The nut is biased leftward as viewed in the figure by a second-stage spring 31 (described later) which is interposed between the nut 7 and the spring seat 2, so that the left end of the nut 7 is brought into contact with the step portion 1*a* and the nut 7 is usually positioned thereby. It should be noted that the nut 7 is prevented from rotating by virtue of its keyway fitting engagement with the body 1.

Figure 5:
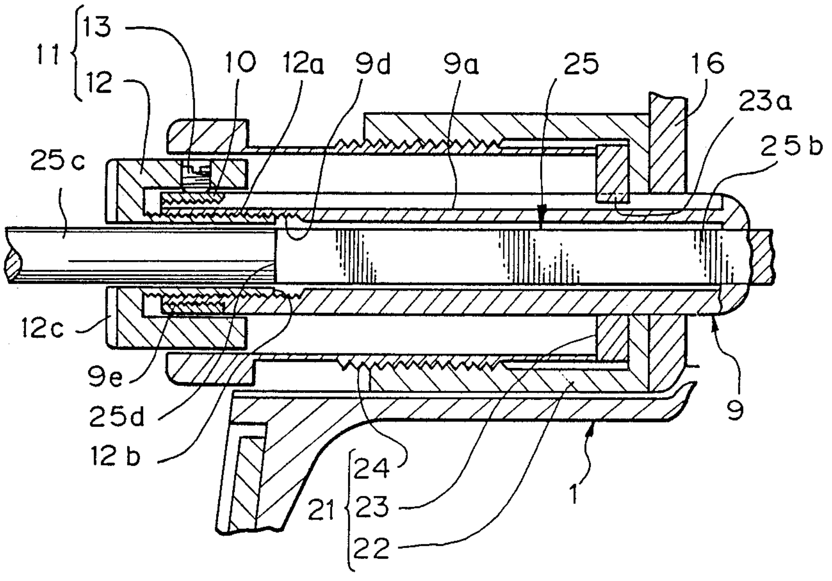
FIG. 5 is a fragmentary enlarged view of an essential part of the embodiment, which shows the assembly adapted for finely adjusting the suction capacity of the pipette and the assembly adapted for preventing rotation of the hollow shaft.

A threaded hollow shaft 9 made of corrosion-resistant aluminium has a keyway 9*a*, a square bore 9*b* and an outer peripheral threaded portion 9*c*, the latter two being provided at the right-hand end thereof, as well as an inner peripheral threaded portion 9*d* and an outer peripheral threaded portion 9*e* which are provided at the left-hand end thereof (see FIG. 5 . The hollow shaft 9 is inserted into the body 1 while extending through the securing plates 15, 16, and the outer peripheral threaded portion 9*c* is rotatably screwed into the inner peripheral threaded portion 7*a* of the nut 7. In this case, the axial movement of the hollow shaft 9 is smoothly guided by the respective central circular bores in the securing plates 15, 16. As shown in FIG. 5, a nut 10 which has substantially the same outer diameter as that of the hollow shaft 9 is screwed on the outer peripheral threaded portion 9*e* at the left-hand end of the shaft 9 and further secured thereto by means of an adhesive (see FIG. 5). The nut 10 serves to prevent a setscrew 13 from falling into the keyway 9*a* of the hollow shaft even when the setscrew 13 is disposed at a position facing the keyway 9*a* as a result of a fine adjustment screw 12 being rotated as described later.

Figure 4:
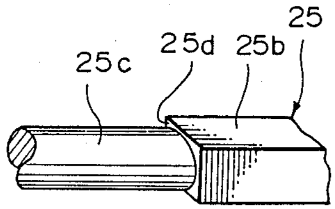
FIG. 4 is a fragmentary perspective view showing the square stop portion of the actuating shaft employed in the embodiment.

A fine adjustment assembly 11 for finely adjusting the suction capacity of the sample consists of a corrosion-resistant aluminium screw 12 which is screwed into the left-hand and of the hollow shaft 9 and a setscrew 13 for fixing the screw 12 to the hollow shaft 9, as clearly shown in FIG. 5. The screw 12 has a threaded portion 12*a* projecting therefrom which is screwed into the inner peripheral threaded portion 9*d* at the left-hand ed of the hollow shaft 9. The screw 12 has a first stop portion 12*b* defined at the right-hand end of the threaded portion 12*a*, the stop portion 12*b* coming into contact with a square stop portion 25*d* (see FIGS. 4 and 5) of an actuating shaft 25 (described later), which square stop portion serves as a second stop portion. It should be noted that it is possible to finely adjust the axial position of the screw 12 by turning it with a special screwdriver that may be engaged with a groove 12*c* provided in the screw 12, thus effecting fine adjustment of the volumetric capacity of the sample as described later. This fine adjustment assembly 11 is not necessarily provided. If not provided, the first stop portion 12*b* can be integrally formed on the hollow shaft 9.

An assembly 21 adapted to prevent the rotation of the hollow shaft 9 consists of a resin housing 22 which is rigidly press-fitted in the left end portion of the body 1, a snap ring 23 accommodated in the housing 22, and a press pipe 24 which is screwed in the housing 22, as clearly shown in FIG. 5. The snap ring 23 has an inner peripheral projection 23*a* that is constantly engaged with the keyway 9*a* of the hollow shaft 9 so that the snap ring 23 rotates together with the shaft 9 as one unit. Normally, the snap ring 23 is pressed by the press pipe 24 so as to be secured to the bottom of the housing 22 which is connected to the body 1 as one unit. Accordingly, the hollow shaft 9, which is secured to the body 1 as one unit through the snap ring 23, is also normally prevented from rotating. The hollow shaft 9 is allowed to rotate only when the volumetric capacity of the pipette is to be varied by unscrewing the press pipe 24.

As shown in FIG. 2, an actuating shaft 25 made of stainless steel has a right end small-diameter portion **25*a*, a central square shaft portion 25*b*, a left end round shaft portion 25*c*, and a square stop portion 25*d* (see FIG. 4) defined by the left-hand end of the square shaft portion 25*b* and thus serving as a second stop portion as described above. The shaft 25 is received in the hollow shaft 9 through fitting engagement between the square shaft portion 25*b* and the square bore 9*b* so that these shafts 25 and 9 are axially slidable relative to each other and also rotatable together as one unit. Thus, the small-diameter portion 25*a* is located inside the nut 7. The round shaft portion 25*c* has a resin button 26 rigidly secured to one end thereof which projects outwardly from the body 1. The square stop portion 25*d* is able to come into contact with the stop portion 12*b* of the fine adjustment screw 12**, as described above.

As shown in FIG. 3, a columnar plunger 27 made of stainless steel is fitted into the cylinder chamber **3*a* in the cylinder 3 through the seal members 4 and 5, and the cylinder chamber 3*a* is thereby defined as an airtight chamber with respect to the inside of the body 1**.

The reference numerals 28 and 29 denote a tubular plunger holder and a stop pipe, respectively, both of which are made of stainless steel. The plunger holder 28 is rigidly press-fitted to the left end portion of the plunger 27. The stop pipe 29 is movably fitted on the small-diameter portion **25*a* of the actuating shaft 25 and, at the same time, the stop pipe 29 is movably fitted in the left end portion of the plunger holder 28. The plunger holder 28 and the stop pipe 29 respectively have a spring seat 28*a* and a second first-stage stop portion 29*a***.

A first-stage spring 30 is accommodated within the body 1 and the cylinder 3 and is fitted on the outer periphery of the plunger 27, two ends thereof being retained by the spring seats 6 and **28*a*, respectively. However, this spring 30 can be accommodated within either the body 1 or the cylinder 3. Thus, the first-stage spring 30 biases the plunger 27 and the plunger holder 28 which are coupled together as one unit to move leftward as viewed in FIG. 2. The first-stage spring 30 further biases the actuating shaft 25 in the same direction through the stop pipe 29, thus causing the square stop portion 25*d* of the square shaft portion 25*b* to come into contact with the stop portion 12*b* of the fine adjustment screw 12. Accordingly, at this time the plunger 27 and the actuating shaft 25 are disposed in their extreme left-hand positions as viewed in FIG. 2. Further, the first-stage spring 30 presses the seal ring 5 and the O-ring 4 against the wall of the cylinder 3 through the spring seat 6 as shown in FIG. 3**, thus serving to ensure the sealing function of the seal means.

A second-stage spring 31 is fitted on the outer periphery of the nut 7 and two ends thereof are retained by the spring seats 2 and **7*d*, respectively. Thus, the second-stage spring 31 biases the nut 7 to move leftward as view in FIG. 2** and as described above.

Thus, by virtue of the functions of he two springs 30 and 31, a stroke $l_1$ (see FIG. 2) for the first stage of travel of the plunger 27 (also the shaft 25) is set between the first-stage stop portion **7*b* of the nut 7 and the second first-stage stop portion 29*a* of the stop pipe 29. At the same time, a second-stage stroke $l_2$ (see FIG. 2) is set between the first second-stage stop portion 7*c* of the nut 7 and the second second-stage stop portion 2*a* of the spring seat 2. For example, $l_1$ is set at 16 mm, while $l_2$ is set at 4 mm. The first-stage stroke $l_1$ is preferably set with an accuracy of within 1/200 of 16 mm. In the case where the first-stage stroke $l_1$ is varied within the range of $\pm 20\%$ relative to the primary stroke value $l_1 = 16$ mm, as described later, it is also preferable to maintain with the accuracy at a similar level to that noted above. To maintain this degree of accuracy, it is necessary to conduct fine adjustment with the fine adjustment screw 12, as described later. The spring loads of the two springs 30 and 31 are set such that the second-stage spring 31 is stronger (by, e.g., 50 to 80%) than the first-stage spring 30 in order to stabilize the operation of the first-stage spring 30**.

According to the above-described arrangement, the first-stage stroke $l_1$ is set through the stop pipe 29, the shaft 25, the fine adjustment screw 12, the hollow shaft 9 and the nut 7, not through any portion of the body 1. Therefore, even if the temperature of the body 1 is raised by the heat transmitted from the operator's hand as it grips the pipette and the body 1 is thereby expanded axially, the stroke $l_1$ is independent of the thermal expansion and there is therefore hardly any risk of error being produced in the stroke $l_{l1}$. Accordingly, it is possible to improve the reproducibility of quantitative determination carried out when a sample is sucked up into and discharged from the pipette, as described later, and it is therefore possible to improve the reliability of the device. Further, since all the parts 29, 25, 12, 9 and 7 which determine in combination the first-stage stroke $l_1$ are made of corrosion-resistant metals, the thermal expansion coefficients of these parts are of a magnitude that is smaller than that of the parts made of a resin material. Accordingly, if the heat of the body 1 should be transmitted to the parts 29, 25, 12, 9 and 7, the degree of expansion in the axial length of these parts is extremely small, so that there is no fear of the first-stage stroke $l_1$ having an error attributable to a difference in the degree of expansion. Thus, the above-described reliability is improved in this point also. By virtue of these advantages, it was possible to obtain' favorable experimental results. More specifically, after conducting experiments using sample suction type pipettes having suction capacities of 40 to 200μl, it was found that the sample suction and discharge reproducing accuracy was increased to $\pm 0.4\%$ (in the case of pipettes having a suction capacity of 40 μl) and to $\pm 0.2\%$ (in the case of the pipettes having a suction capacity of 200 μl).

Although the actuating shaft 25, the stop pipe 29, the plunger holder 28 and the plunger 27 may theoretically be formed as one integral structure from the functional point of view, they are normally formed separately from each other for the following reasons: (1) to facilitate assembly and disassembly of these parts; (2) to allow the axis of the actuating shaft 25 relative to the hollow shaft 9 to be eccentric with respect to the axis of the plunger 27 relative to the cylinder 3, thereby preventing local rubbing of the plunger 27 against the inner periphery of the cylinder 3 when the plunger 27 is sliding; and (3) to inhibit the plunger 27 from rotating when the actuating shaft 25 is turned (as described later), thereby preventing undesirable rubbing of the plunger 27 against the inner periphery of the cylinder 3, which rubbing would otherwise occur due to the above-described eccentricity.

A display mechanism 32 for displaying the suction capacity of the sample consists of four resin rotary drums 33 (each having a gear portion 33a) each having ten numerical indications, i.e., 0, 1, 2, . . . 9, 0, provided around its periphery, and three resin pinions 35 which are supported on a stainless steel shaft 34 rigidly secured to the pair of securing plates 15 and 16. Each pinion 35 is mutually meshed with the gear portions 33a of a pair of adjacent drums 33. Among the four drums 33, only the drum 33 on the extreme right (as viewed in FIG. 2) is engaged with the keyway 9a of the hollow shaft 9. Accordingly, when the actuating shaft 25 is turned by a predetermined amount to set a desired suction capacity, the rotation of the right-hand drum 33 may be successively transmitted to the subsequent drums 33 on its left while executing a carry (or carries), 4-digit suction capacity value as a whole thereby being displayed through the transparent window 1e. As to the display mechanism 32, although the arrangement of the display function itself has been known previously, it is novel in respect to the fact that the whole of the mechanism 32 is assembled as one unit within the space between the securing plates 15 and 16 at the same time as the operation of presetting the above suction capacity value is performed before the mechanism 32 is incorporated in the body of the pipette, the assembly thereafter being incorporated in the body. Accordingly, the display mechanism 32 according to the present invention is remarkably convenient in comparison with the conventional arrangement in which the constituent elements of the display function must be assembled while being individually incorporated into the body.

A tip eject mechanism 41 consists of a first ejector 42 and a second ejector 43 which are each made of a resin material. The first ejector 42 is a relatively narrow elongated member which has a substantially U-shaped cross-sectional configuration. The first ejector 42 is inserted into the through-bore 1b provided in the body 1 and has a spring 44 interposed between a spring seat 42a provided thereon and the spring seat 16a of the securing plate 16. The second ejector 43 is in the shape of a cylinder which covers substantially the whole of the outer periphery of the cylinder 3. The second ejector 43 is axially and slidably fitted on the cylinder 3 and has its engagement projection 43a engaged with an engagement bore 42b provided in the first ejector 42. Accordingly, the first and second ejector 42, 43 are apparently biased leftward as viewed in FIG. 2 by the spring 44, so that the stop potion 43b of the second ejector 43 is in contact with the stop portion 1f of the body 1.

A resin tubular tip 45 is prepared and used for each kind of sample. The tip 45 is press-fitted on and thereby secured to the nozzle portion 3c of the cylinder 3. A slight gap $l_3$ is provided between the facing ends of the tip 45 and the second ejector 43.

A resin spacer 46 is press-fitted into the nozzle portion 3b of the cylinder 3 until a step portion 46a of the spacer 46 abuts against the distal end of the nozzle portion 3b, the spacer 46 being fixed in this state at all times. Thus, an axial groove 46b is defined between the spacer 46 and the nozzle portion 3b, the groove 46b providing communication between the cylinder chamber 3a and the interior of the tip 45. The spacer 46 serves to minimize the volumetric capacity of the space defined between the cylinder chamber 3a and the inlet of the tip 45 when the tip 45 is attached to the nozzle portion 3b. Thus, the effect of a change in pressure of air within said space (this pressure change being caused by any temperature change brought about by a hand gripping the body 1) is minimized, so that, when a sample is sucked up into the tip 45, the risk of variation in measurement of the volumetric capacity of the sample is advantageously reduced. It should be noted that the spacer 46 is not necessarily needed for certain types of pipette.

According to the above-described arrangement, the space which is defined by the inner periphery of the nut 7 is allowed to communicate with the ambient air through the gap between the nut 7 and the plunger holder 28, the extending slot 1d provided in the body 1 and the space in the ejector mechanism 41. Accordingly, even if the heat of the operator's hand as it grips the pipette is transmitted to the interior of the body 1 such as to expand the air in the interior, the expanded air will be immediately released to the atmosphere through the extending slot 1d. Therefore, there is no fear of error in the suction capacity which would otherwise be produced by a slight movement of the plunger 27 as a result of the above-described expansion in a case where no extending slot 1d is provided, and it is therefore possible to achieve a corresponding increase in the degree of reproducing accuracy.

The operation of sucking a sample will next be explained.

Assuming that a desired suction capacity has already been set, the pipette is gripped in one hand, and the button 26 is depressed with the thumb. In consequence, the actuating shaft 25, the stop pipe 29, the plunger holder 28 and the plunger 27, which are seemingly integral with each other, slide downward by an amount corresponding to the dimension $l_1$ (see FIG. 2) against the force of the first-stage spring 30 until the first-stage stop portions 29a and 7b abut against each other. In this state, the lower end portion of the tip 45 is immersed in the sample.

In this state, when the pressing force is removed from the button 26, the actuating shaft 25 and the plunger 27 are moved upward by means of the force of the first-stage spring 30 until the square stop portion 25d of the shaft 25 abuts against the stop portion 12b of the fine adjustment screw 12. As a result, a predetermined amount of the sample is sucked up into the tip 45.

Then, the end portion of the tip 45 of the pipette is inserted into another container, and the button 26 is depressed again. In consequence, the plunger 27 moves downward by an amount corresponding to the dimension $l_1$ until the stop portions 29a and 7b abut against each other in the same way as in the case described above. By effecting this first-stage discharge, the sample is discharged into the second container from the tip 45.

As the button 26 is further depressed, the shaft 25 and the plunger 27 slide downward by an amount corresponding to the dimension $l_2$ (see FIG. 2) against the forces of the first- and second-stage springs 30 and 31 until the second-stage stop portions 7c and 2a come into abutment with each other. By performing this second-stage discharge, any of the sample which may remain within the tip 45 after the completion of the first-stage discharge is completely discharged. Accordingly, there is no fear of error in measurement of the sample, that is, there is no difference between the amount of sample sucked in and the amount discharged. Thus, it is possible to transfer a predetermined amount of the sample precisely and reliably.

The following is a description of the operation carried out when varying the capacity to be employed for sucking a sample.

Referring to FIG. 2, the press pipe 24 in the assembly 21 for preventing the rotation of the hollow shaft 9 is turned in the couterclockwise direction to release the snap ring 23 from the fixing to the housing 22. Thus, the actuating shaft 25, the hollow shaft 9 and the snap ring 23 become free to rotate relative to the housing 22.

If it is desired to reduce the suction capacity, the button 26 is turned in the clockwise direction to rotate the shaft 25 and the hollow shaft 9 together as one unit in the same direction. As a result, the hollow shaft 9 moves downward by a predetermined amount by virtue of the threaded engagement between the outer peripheral threaded portion 9*c* thereof and the inner peripheral threaded portion 7*a* of the nut 7. Accordingly, the fine adjustment screw 12 which is connected to the hollow shaft 9 as one unit also moves downward by a predetermined amount. Thus, the actuating shaft 25 is pressed downward by the fine adjustment screw 12 through the square stop portion 25*d* to move downward by a predetermined amount against the force of the first-stage spring 30. Consequently, the stop pipe 29 also moves downward by a predetermined amount, so that the first-stage stroke $l_1$ defined between the first-stage stop portions 29*a* and 7*b* is reduced by said predetermined amount. In this way, a reduced suction capacity is set. On the other hand, said rotation of the hollow shaft 9 activates the extreme right-hand drum 33 as viewed in FIG. 2) in the display mechanism 32 to rotate, and the other drums 33 are thereby rotated successively. As a result, a numeral which represents the reduced set suction capacity is displayed through the transparent window 1*e*. If, for example, the numeral is changed from 200 to 180, this means that the set suction capacity is reduced from 200 μl to 180 μl. Conversely to increase the set suction capacity, it suffices to increase the first-stage stroke $l_1$ by turning the button 26 in the direction reverse to the above. Subsequent operations are the same as those in the case described above.

As will be clear from the foregoing description, the actuating shaft 25 (together with the button 26) is used not only to suck and discharge a sample but also to effect an operation of variably setting a desired volumetric capacity to be employed for sucking a sample. Accordingly, the number of parts required is smaller than that of a pipette in which the above-described operations are respectively carried out with two separate mechanisms. In addition, the operation of variably setting suction capacity is facilitated.

In the case where the first-stage stroke $l_1$ is to be set with an accuracy of within 1/200 of $l_1$, the fine adjustment screw 12 is employed in order to make fine adjustment of the suction capacity as described above. To effect fine adjustment, the setscrew 13 is first loosened, and the fine adjustment screw 12 is turned either in the clockwise or counterclockwise direction with a special screwdriver so that the screw 12 is slightly moved axially relative to the hollow shaft 9. Thereafter, the setscrew 13 is tightened. As a result, the shaft 25 moves by the same distance as said slight movement of the fine adjustment screw 12, thus effecting fine adjustment of the first-stage stroke $l_1$.

The tip eject operation which is carried out by the eject mechanism 41 will next be explained. The upper end of the first ejector 22 is first pressed downward with the thumb. In consequence, the first and second ejectors 42, 43 are rapidly slid downward against the force of the spring 44. As a result, the lower end of the second ejector 43 comes into contact with the upper end of the tip 45 and then presses the tip 45 downward. Accordingly, the tip 45 is quickly removed from the nozzle portion 3*b*. Thus, the pipette is ready to have another tip attache thereto. The eject mechanism 41 enables the tip 45 to be reliably ejected from the nozzle portion 3*b* with one touch of the upper end of the first ejector 42. The eject mechanism 41 further offers the following advantage. Namely, after the pipette has been used to suck up a sample which it is desired will remain untouched by the operator's hand, it is possible to eject the tip 45 without touching the sample remaining on the tip 45, which is favorable from the sanitary point of view.

As has been described above, the present invention provides the following various advantages.

According to the present invention, the first-stage stroke $l_1$ for sucking and discharging a sample is defined between the first first-stage stop portion 7*b* of the nut 7 and the second first-stage stop portion 29*a* of the actuating shaft 25, and this stroke $l_1$ is set through the shaft 25, the first stop portion 12*b* of the threaded hollow shaft 9, the hollow shaft 9 and the nut 7, not through any portion of the body 1.

Accordingly, even if the temperature of the body 1 is raised by the heat transmitted from the operator's hand as it grips the pipette and the body 1 is thereby expanded axially, the above-described stroke $l_1$ is independent of this expansion of the body 1 and there is therefore hardly any error produced in the stroke $l_1$. Accordingly, it is possible to improve the reproducibility of quantitative determination conducted with the pipette when a sample is sucked and discharged, and it is therefore possible to improve the reliability of the device.

In addition, since the parts for determining the first-stage stroke $l_1$ need not be assembled with respect to the body 1, no troublesome work is required. Accordingly, the assembly operation is facilitated and the cost of assembly is reduced correspondingly.

Although the present invention has been described through specific terms, it should be noted here that the described embodiment is not necessarily exclusive and various changes and modifications may be imparted thereto without departing from the scope of the invention which is limited solely by the appended claims.

What is claimed is:

1. A variable pipette comprising:

a substantially tubular body (1) having means defining a first opening at one end thereof, means defining a second opening at the other end thereof, and a positioning portion (1*a*) provided at a predetermined position on an inner periphery of the body;

a substantially tubular cylinder (3) rigidly secured to the first opening of said body;

a nut (7) having an inner peripheral threaded portion (7*a*), a first first-stage stop portion (7*b*), and a first second-stage stop portion (7*c*), said nut (7) being inserted in said body between said positioning portion (1*a*) and said cylinder (3) such that said nut is unable to rotate relative to said body but is axially slidable relative to said body;

a second-stage spring (31) accommodated within said body and arranged to bias said nut rearwardly so that said nut is brought into contact with said portion (1*a*);

a threaded hollow shaft (9) inserted into the second opening of said body, said shaft (9) having a first step portion (12*b*) at a rear portion thereof and an outer peripheral threaded portion (9*c*) at a forward position thereof, said outer peripheral threaded portion being in threaded engagement with the inner peripheral threaded portion (7*a*) of said nut so that said shaft is rotatable;

an actuating shaft (25) received in said hollow shaft (9) in such a manner that said actuating shaft is rotatable together with said hollow shaft as one unit and is axially slidable relative to said hollow shaft, said actuating shaft (25) having a second first-stage stop portion (29*a*) at a forward portion thereof which projects from the forward portion of said hollow shaft, said second first-stage stop portion (29*a*) facing the first first-stage stop portion (7*b*) of said nut across a space which defines a first-stage stroke ($l_1$), said actuating shaft further having a second stop portion (25*d*) and an actuating portion (26) at a rear portion thereof;

a plunger (27) received in said cylinder to define an airtight cylinder chamber (3*a*) within said cylinder, said plunger being movable at least axially together with said actuating shaft (25) as one unit;

a first-stage spring (30) accommodated within said body (1) and/or said cylinder (3) such as to bias said plunger (27) and said actuating shaft (25) rearwardly thereby bringing the second stop portion (25*d*) of said actuating shaft into contact with said first stop portion (12*b*); and a second second-stage stop portion (2*a*) provided on either said body or said cylinder so as to face the first second-stage stop portion (7*c*) of said nut across a space which defines a second-stage stroke ($l_2$).

2. The pipette according to claim 1, wherein the position of the first stop portion (12*b*) of said threaded hollow shaft (9) includes means for finely adjusting the shaft in the axial direction.

3. The pipette according to claim 1 or 2, wherein said actuating shaft (25) and said plunger (27) are formed separately from each other and are rotatable relative to one another.

4. The pipette according to claim 3, said nut (7), said threaded hollow shaft (9, 12*b*), said actuating shaft (25) and said nut (7), said threaded hollow shaft (9, 12*b*), said actuating shaft (25) and said plunger (27), are made of metallic materials.

5. The pipette according to claim 1 or 2, wherein the outside of said body (1) communicates with at least the inside of said nut (7) through a communicating bore (1*d*).

6. The pipette according to claim 1 or 2, wherein said threaded hollow shaft (9) further has a threaded portion (9*d*) at a rear portion thereof and a fine adjustment screw (12) for finely adjusting the suction capacity of the pipette which is screwed onto said threaded portion (9*b*), said first stop portion (12*b*) being integrally formed on a forward portion of the fine adjustment screw.

* * * * *